United States Patent
Sakamoto et al.

(10) Patent No.: US 6,351,847 B1
(45) Date of Patent: Feb. 26, 2002

(54) METHOD AND DEVICE FOR ACQUIRING USAGE DATA OF APPLICATION

(75) Inventors: Yasuhisa Sakamoto; Kouji Kishi; Takuya Sumi, all of Tokyo (JP)

(73) Assignee: Nippon Telegraph and Telephone Corp., Tokyo (JP)

( * ) Notice: Subject to any disclaimer, the term of this patent is extended or adjusted under 35 U.S.C. 154(b) by 0 days.

(21) Appl. No.: 09/295,929

(22) Filed: Apr. 21, 1999

(30) Foreign Application Priority Data

Apr. 22, 1998 (JP) .............................. 10-128262

(51) Int. Cl.$^7$ .............................. G06F 9/44; G06F 11/30
(52) U.S. Cl. .............................. 717/4; 709/224
(58) Field of Search .............................. 717/4; 709/224, 709/223, 318

(56) References Cited

U.S. PATENT DOCUMENTS

| | | | | |
|---|---|---|---|---|
| 5,675,510 A | | 10/1997 | Coffey et al. | 709/224 |
| 5,796,952 A | * | 8/1998 | Davis et al. | 709/224 |
| 5,958,010 A | * | 9/1999 | Agarwal et al. | 709/224 |
| 6,018,619 A | * | 1/2000 | Allard et al. | 709/224 |
| 6,021,437 A | * | 2/2000 | Chen et al. | 709/224 |
| 6,035,332 A | * | 3/2000 | Ingrassia, Jr. et al. | 709/224 |
| 6,073,241 A | * | 6/2000 | Rosenberg et al. | 713/201 |
| 6,112,240 A | * | 8/2000 | Poque et al. | 709/224 |
| 6,122,663 A | * | 9/2000 | Lin et al. | 709/224 |
| 6,138,155 A | * | 10/2000 | Davis et al. | 709/224 |
| 6,167,520 A | * | 12/2000 | Touboul | 713/200 |
| 6,230,204 B1 | * | 5/2001 | Fleming, III | 709/229 |

FOREIGN PATENT DOCUMENTS

| | | |
|---|---|---|
| JP | 4-71042 | 3/1992 |
| JP | 4-107644 | 4/1992 |
| JP | 5-61732 | 3/1993 |
| JP | 8-314771 | 11/1996 |
| WO | WO96/41495 | 12/1996 |

\* cited by examiner

Primary Examiner—Tuan Q. Dam
(74) Attorney, Agent, or Firm—Kenyon & Kenyon

(57) ABSTRACT

An information processing device for acquiring usage data of an application on the information processing device loads a monitoring library when an application is launched. The monitoring library intercepts event information arising from the application at some midpoint between the application and an operating system, or between the application and a library, selects some events among the event information, and interprets the selected events on the basis of a predetermined process. Then, the monitoring library sends the event information to a monitoring process. The monitoring process creates usage data on the basis of the event information and stores the usage data in a file.

16 Claims, 8 Drawing Sheets

101: INFORMATION PROCESSING DEVICE

101: INFORMATION PROCESSING DEVICE

FIG.5

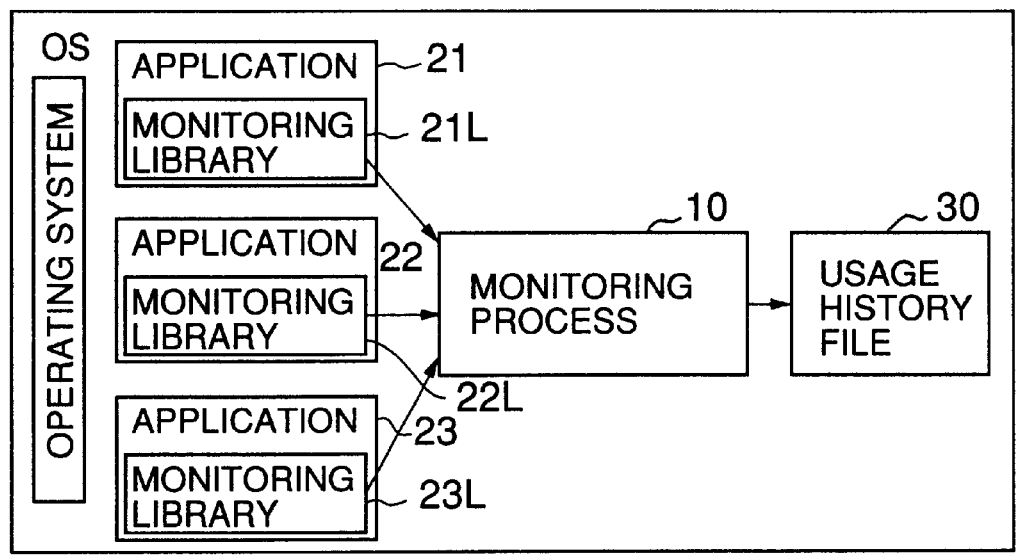

102: INFORMATION PROCESSING DEVICE

FIG.6

| ITEM | EXAMPLE |
|---|---|
| (A) HISTORY OF PAGE DISPLAYED ON BROWSER | ADDRESS OF PAGE (URL), TITLE, DISPLAY START TIME, DURATION OF DISPLAY |
| (B) DESIGNATION METHOD OF PAGE, MOVEMENT METHOD BETWEEN PAGES, HOW TO REACH TARGET PAGE | HYPERLINK, BOOKMARK, KEY INPUT, FORWARD BUTTON, BACKWARD BUTTON, SPECIAL MENU SPECIFIC TO BROWSER, INSTRUCTION BY ANOTHER APPLICATION |
| (C) OPERATION TO PAGE DISPLAYED ON BROWSER | REGISTRATION TO BOOKMARK, PRINTOUT OF PAGE |
| (D) ADDRESS OF FILE REQUESTED BY BROWSER | URL OF IMAGE WITHIN PAGE, URL OF FRAME WITHIN PAGE |

104: INFORMATION PROCESSING DEVICE

| WINDOW IDENTIFIER | REQUEST TIME | FILE ADDRESS(URL) |
|---|---|---|
| 0001 | 1998/02/15 10:31:22 | http://www.company.com/index.html |
| 0001 | 1998/02/15 10:31:27 | http://www.company.com/frame.html |
| 0001 | 1998/02/15 10:31:35 | http://www.company.com/gifs/image.gif |
| 0002 | 1998/02/15 10:32:06 | http://www.company.com/index2.html |
| 0002 | 1998/02/15 10:32:11 | http://www.company.com/gifs/image2.gif |

METHOD AND DEVICE FOR ACQUIRING USAGE DATA OF APPLICATION

BACKGROUND OF THE INVENTION

1. Field of the Invention

The present invention generally relates to a method for acquiring data regarding use of an application on an information processing device, and more particularly to a method and a device for acquiring data regarding use of an application on an information processing device such as a computer, in which the method is applicable to research on an application usage trend, a measurement of an effect of Internet media, an advertising media value evaluation, and the like.

2. Description of the Related Art

In recent years, network services such as a WWW service and an electronic mail service have become popular even with in ordinary households. In connection with this, personal computers with a communication facility have become widespread, and integration of a computer and a household electric appliance, for example, a television with a communication facility, is progressing.

Conventionally, in an network communication service using a server-client method in which an information server provides the service according to a request from an information terminal, if usage information of the service is necessary, the information server keeps a log of the information. Specifically, every time the information terminal sends a request for a service to the information server, the information server makes a record of the usage information such as a description of the service, user information, time, and the like.

On the other hand, even if the operating system of the information terminal has the function of recording usage information of a service, the information terminal can acquire only very limited information such as an error log since getting usage information is highly application dependent.

FIGS. 1A–1C are diagrams for explaining conventional method for acquiring usage data of an application which operates on an information terminal.

Conventionally, three methods are adopted for acquiring usage data of an application which operates on an information terminal. The three methods are a method of communication between processes, a library substitution method, and an application modification method as shown in FIGS. 1A–1C, respectively.

FIG. 1A shows the method of communication between processes. In this figure, the monitoring process 1 includes a plurality of processes. In this method, a plurality of monitoring processes carry out data communication via the operating system such that a monitoring process can get usage data of an application 2 from another monitoring process.

For example, this method is realized in a Windows operating system of Microsoft Corporation as an OLE or DDE method. When using WWW browser as an application on the Windows operating system, information such as an address of a WWW page on display can be acquired by an inquiry from an external process.

In the library substitution method shown in FIG. 1B, a library which is a set of functions called by an application 2a is replaced with a library 2aL which has a monitoring capability such that the library 2aL can get a history of function calls of the application 2a.

For example, in the case of the Windows operating system, by replacing a standard communication library called Wsock32.dll with a communication library which has a monitoring capability and naming it the same name as Wsock32.dll, a history of calling various functions of the library from the WWW browser can be acquired.

In the application modification method shown in FIG. 1C, by using a modified application 2b, usage data of the application 2b is recorded on a usage history file 3.

However, the conventional method of communication between processes shown in FIG. 1A has a problem that the method is hard to be implemented within an application and only limited data can be acquired since recording and/or providing of a usage history of an application is not of a direct benefit to a user generally.

Moreover, in the case of the application modification method shown in FIG. 1C or the library substitution method shown in FIG. 1B, there is a problem that there is no general versatility since an application or each library needs to be modified. Further, since the application or each library needs to be redistributed in addition to the modification, the cost becomes high. Recently, in particular, since an application is frequently updated, the above problems have become more noticeable.

SUMMARY OF THE INVENTION

It is an object of the present invention to provide a method and an information processing device for effectively acquiring usage data of an application on an information processing device, in which the method and the information processing device are applicable to research on an application usage trend, a measurement of an effect of Internet media, an advertising media value evaluation, and the like.

The above object of the present invention is achieved by a method for acquiring usage data of an application on an information processing device, the method including the steps of:

loading a monitoring library according to an instruction from a monitoring process when an application is launched;

obtaining event information arising from the application by the monitoring library;

sending the event information to the monitoring process;

creating usage data on the basis of the event information by the monitoring process; and storing the usage data in a file.

According to the above invention, since event information is intercepted by the monitoring library which is inserted in the application, detailed usage information can be acquired without any modification of the application.

In the above-mentioned method, the step of getting may include the steps of:

intercepting the event information at some midpoint between the application and an operating system, or between the application and a library by the monitoring library; and selecting at least one event among the event information and interpreting the at least one event on the basis of a predetermined process.

According to this invention, detailed usage information can be acquired by only modifying the predetermined process without any modification of the application.

In the above-mentioned method, if the monitoring process monitors a plurality of applications, at least one of the monitoring libraries may aggregate usage data arising from the applications in the monitoring process.

According to this invention, usage data of a plurality of applications can be acquired effectively.

BRIEF DESCRIPTION OF THE DRAWINGS

Other objects, features and advantages of the present invention will become more apparent from the following detailed description when read in conjunction with the accompanying drawings, in which:

FIG. 5 is a block diagram of an information processing device according to a second embodiment of the present invention;

FIG. 6 is a table showing an example of the usage data of the embodiments of the present invention;

DETAILED DESCRIPTION OF THE PREFERRED EMBODIMENTS

Figure 1A:
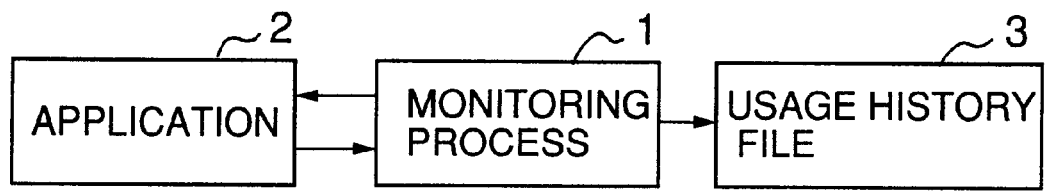
FIG. 1A is a diagram for explaining a first conventional method for acquiring usage data of an application on an information processing device.
Figure 1B:
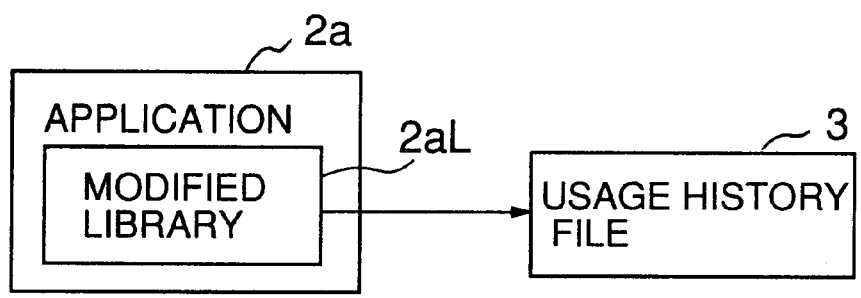
FIG. 1B is a diagram for explaining a second conventional method for acquiring usage data of an application on an information processing device.
Figure 1C:
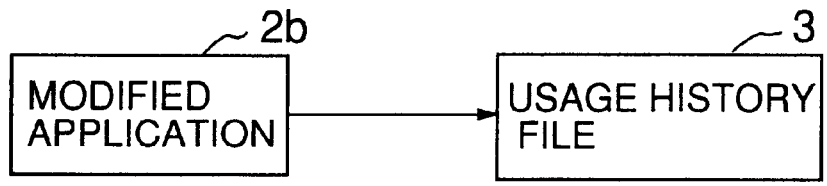
FIG. 1C is a diagram for explaining a third conventional method for acquiring usage data of an application on an information processing device.
Figure 2:
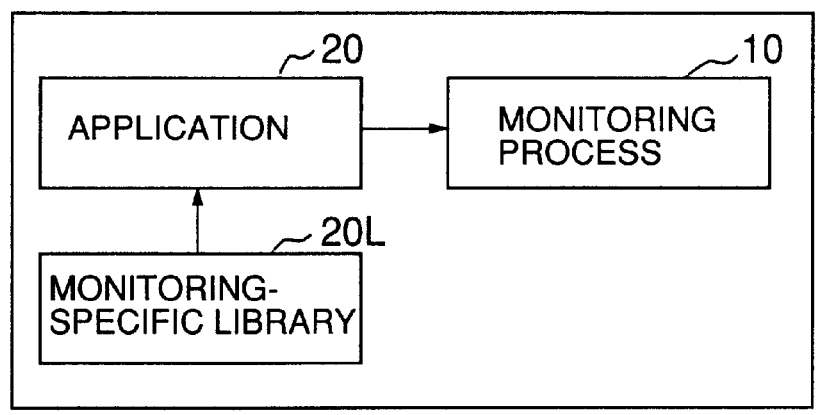
FIG. 2 is a block diagram of an information processing device according to a first embodiment of the present invention.

FIG. 2 is a block diagram showing an information processing device 101 according to a first embodiment of the present invention in which usage data of an application is acquired. In addition, FIG. 2 shows a status (initial processing) at an application startup in the information processing device 101.

In this embodiment, the information processing device 101 is, for example, a personal computer. An application 20 on the information processing device 101 acquires usage data. Specifically, at startup of the application 20 which will be monitored, a monitoring process 10 which resides in the information processing device 101 issues an instruction to the application 20 for loading a monitoring-specific library 20L. Then, according to the instruction, the application 20 loads the monitoring-specific library 20L.

Figure 3:
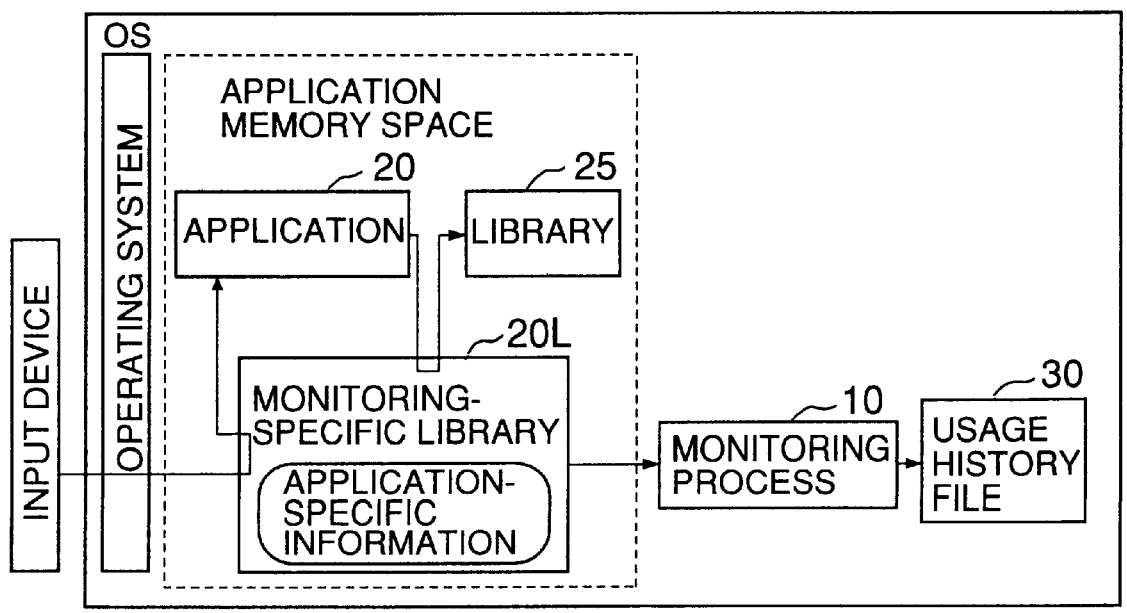
FIG. 3 is a diagram for explaining a status of the information processing device when an application is executed.

FIG. 3 is a block diagram showing a status (monitoring status) at run-time of the application 20 on the information processing device 101.

The monitoring-specific library 20L acquires necessary event information among event information which arises from the operating system (OS). Specifically, the monitoring-specific library 20L interrupts between the application 20 and the operating system OS so as to intercept data at some midpoint between the application 20 and the operating system OS. Then, the monitoring-specific library 20L selects among event information according to an application-specific process which will be described later, and interprets the selected event information. After that, the monitoring-specific library 20L sends the interpreted event information to the monitoring process 10 one after another. The monitoring process 10 creates usage data on the basis of the event information and stores the usage data in a usage history file 30.

In the following, the application-specific process will be described. There are various kinds of primary information (event information) which can be acquired by the monitoring-specific library 20L. The following are examples of the event information communicated between the operating system and the application if the application is a WWW browser:

(Event Name) - - - (Meaning)

WM_COMMAND - - - Push of a button of the browser

WM_DDE_EXECUTE - - - Instruction from an other application

WM_KEYDOWN - - - Input from a keyboard

WM_SETTEXT - - - Change of a character string such as a file address.

However, since only a part of all event information can become the usage data, it is necessary to select among the event information and to convert the selected event information into the usage data. These processes are called the application-specific process.

For example, in the case that only the file address is necessary as the usage data, the application-specific process is a procedure of extracting only the WM_SETTEXT event information among many events, extracting the argument, and recording the argument as the file address.

Figure 4:
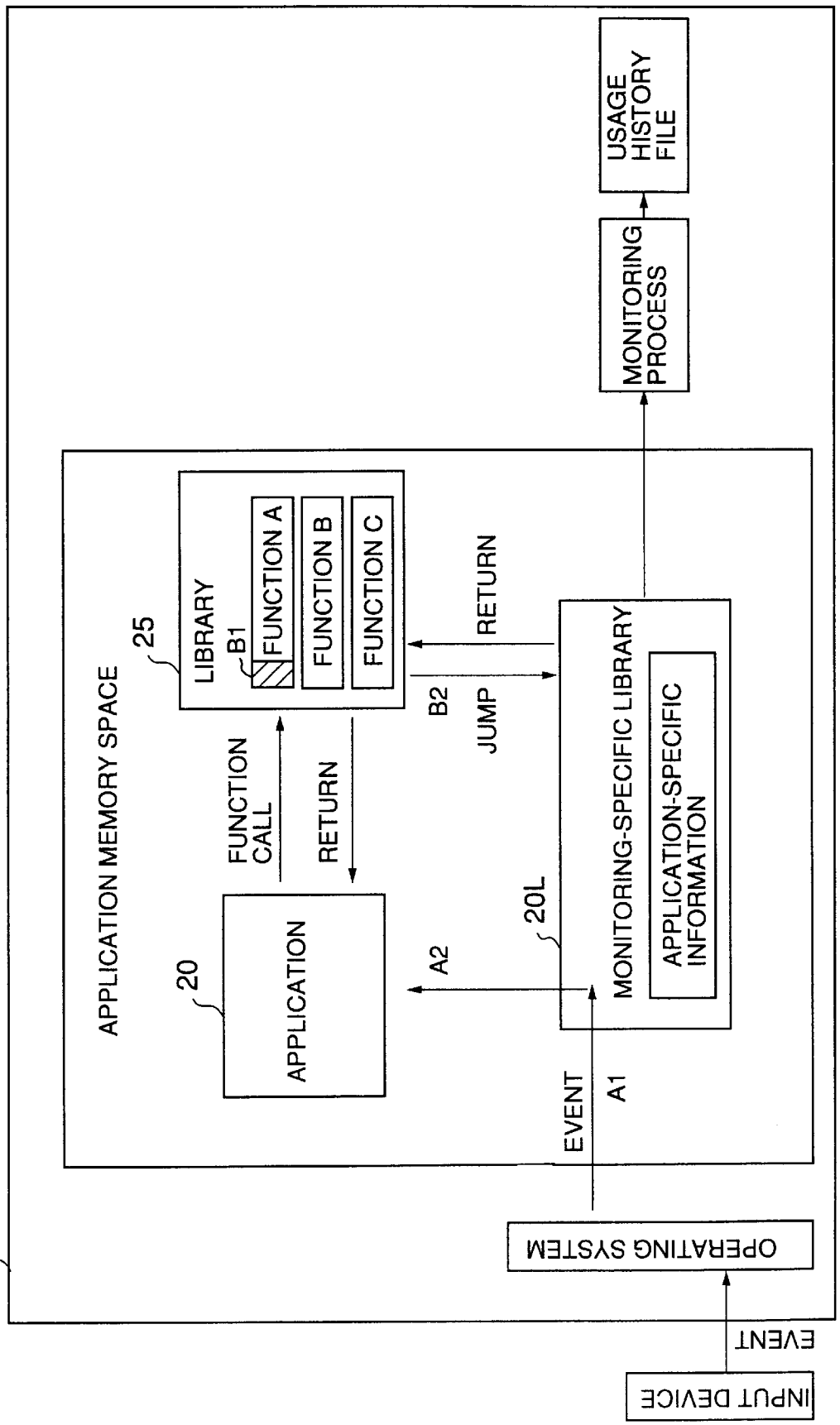
FIG. 4 is a diagram for explaining methods for intercepting data by a monitoring-specific library.

In addition, instead of interrupting between the application 20 and the operating system OS to acquire the event information, which will be called a first method, the monitoring-specific library 20L may interrupt between the application 20 and a library 25 so as to intercept data at some midpoint between the application 20 and the library 25, which will be called a second method. The first and the second methods will be described with reference to FIG. 4 in the following.

The first method is indicated by steps A1 and A2. In step A1, the monitoring-specific library 20L obtains event information from the operating system OS. Next, the monitoring-specific library 20L sends the event information to the application 20 in step A2.

The second method is indicated by steps B1–B2. First several bytes of a function such as a "send" function in the library 25 are rewritten in step B1 so that processing of the function jumps to the monitoring-specific library 20L in step B2, and the monitoring-specific library 20L acquires the argument of the function.

The capability of the library 25 shown in FIG. 3 is not limited since the library 25 is a file separated from the application and has various capabilities. Thus, all of basic processes such as reading/writing of a file, sending/receiving data via a network and displaying various information are realized by the library 25.

In this embodiment, wsock32.dll which is a network communication library is used as the library. This library has functions for data communication on the Internet. Almost all Internet applications such as electronic mail, the WWW browser and a file transfer use this library.

The library includes about 50 kinds of functions. Examples of the functions are as follows:

(function)

send - - - for sending data to another computer, recv - - - for receiving data from another computer, gethostbyname - - - for finding another computer, connect - - - for establishing a connection.

FIG. 5 is a block diagram of an information processing device 102 according to a second embodiment of the present invention. FIG. 5 shows a status (a monitoring status) in which a plurality of applications are running.

The information processing device is a personal computer, for example.

As shown in the figure, when one monitoring process 10 monitors a plurality of applications 21, 22, and 23, each of monitoring-specific libraries 21L, 22L, and 23L which are inserted in the applications 21, 22, and 23, respectively, aggregates usage data which arises from the applications 21, 22, and 23 to the monitoring process 10.

Next, an example of the above-mentioned embodiment in which a WWW browser is used as the application will be described.

The WWW browser is an application which obtains information stored on at least one WWW server via the Internet and displays the information for a user to browse. In this case, the unit of the information for browsing is a page which is a set of information including one or more components described by HTML. An address called a URL which indicates a location in the information space (the Internet) is attached to each of the components which form the set of information.

A user can see necessary information by designating a specific page using the URL. Further, the pages can be related mutually by hyperlinks so that a user can traverse related pages one after another by clicking on a hyperlink indication of the page.

The WWW service is a service based on a server-client system. The basic operation will be described in the following.

(1) A request is sent to a server from the browser which is a client.

(2) The server receives the request from the client and returns a page corresponding to the request as a response.

(3) The browser receives the response and displays it. This series of procedural steps is defined as the HTTP protocol.

FIG. 6 is a table showing examples of usage data according to the above-mentioned embodiments and showing items useful as the usage data of the WWW browser.

The item (A) in FIG. 6 can be acquired even by the conventional method of communication between processes, and the items (B)–(D) can not be acquired by the conventional methods.

According to the above-mentioned embodiments, each of the monitoring-specific libraries 21L–23L is loaded in applications 21–23 respectively. Then, each of the monitoring-specific libraries 21L–23L monitors various input events which are sent to the WWW browser from the operating system OS so that the items (B) and (C) which relate to input operations can be acquired. Examples of the input events are a click of a mouse button, text input to an input field, use of a menu bar, and the like.

Moreover, the monitoring-specific libraries 21L–23L monitor function call events which are associated with network communication and are exchanged between the main body of the WWW browser and a communication library so that operating information such as the item (D) in the application 21–23 can be acquired.

In the following, the operation for acquiring the item (D) will be described as a third embodiment, in which the browser makes a request to the server for a file address (URL), and the file address (URL) is acquired by monitoring the function call.

Figure 7:
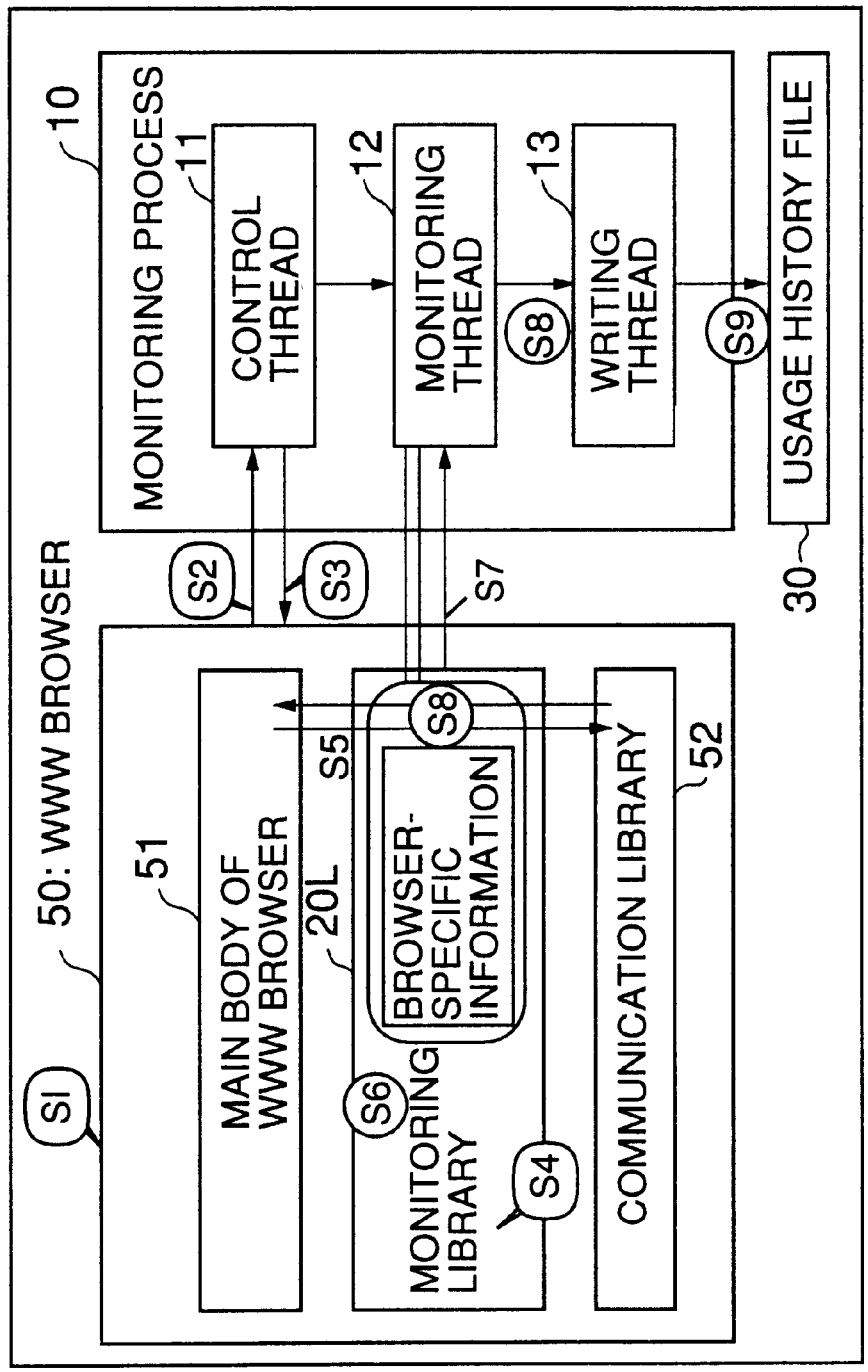
FIG. 7 is a block diagram of an information processing device according to a third embodiment of the present invention.

FIG. 7 is a block diagram of an information processing device 103 according to the third embodiment of the present invention, and shows the operation of monitoring a history of requesting a file by the WWW browser.

The information processing device 103 is a personal computer, for example. As shown in FIG. 7, the information processing device 103 includes the monitoring process 10, a WWW browser 50, and the usage history file 30. The WWW browser 50 includes a main body 51 of the browser, a communication library 52, and the monitoring-specific library 20L.

Figure 8:
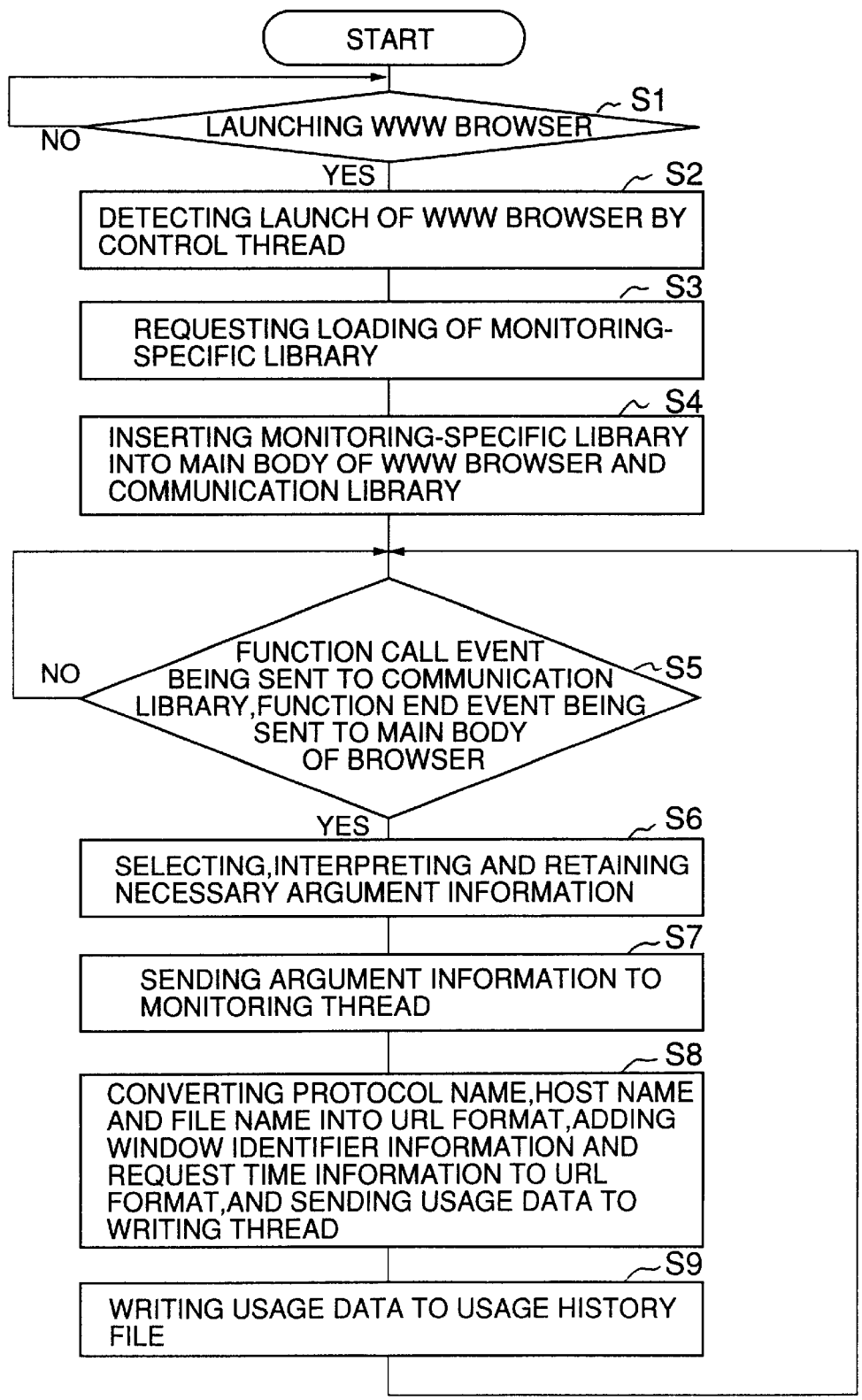
FIG. 8 is a flowchart showing the operation of the information processing device when a WWW browser requests a file.

FIG. 8 is a flowchart showing the operation of monitoring the history of requesting a file by the WWW browser. The operation will be described with reference to FIG. 8 and FIG. 7 in the following.

The monitoring process 10 resident in the information processing device 103 waits until the WWW browser 50 is launched. Then, when the browser is launched by a user in step 1, libraries of a library group including the communication library 52 are loaded one after another. The communication library 52 is, for example, wsock32.dll, in the case of using the Windows OS as the operating system. In step 2, a control thread 11 in the monitoring process 10 detects the startup of the WWW browser 50. In step 3, the control thread 11 makes a request of the WWW browser for loading the monitoring-specific library 20L.

In step 4, the loaded monitoring-specific library 20L rewrites a head part of a program of the communication library 52 in run-time memory space, and inserts itself between the main body 51 of the browser and the communication library 52. At this time, the control thread 11 launches a monitoring thread 12 for receiving event information from the monitoring-specific library 20L in the WWW browser 50.

When the user designates a page, the WWW browser 50 makes a request of an external server for a file by calling a network send function (generally the "send" function) in the communication library 52. In step 5, this function call event is sent to the communication library 52 through the monitoring-specific library 20L. And, when function processing in the communication library 52 ends, a function end event is sent to the main body 51 of the browser through the monitoring-specific library 20L.

When the function call event or the function end event passes through the monitoring-specific library 20L, the monitoring-specific library 20L selects among functions on the basis of browser-specific information, and retains necessary argument information in step 6. In the case of acquiring the request file address, the monitoring-specific library 20L chooses only the network send function (generally the "send" function), and retains a protocol name such as "http", a host name such as "www.company.com" and a file name such as "index.html" to be included in arguments of the network send function.

In step 7, the monitoring-specific library 20L sends the retained information to the monitoring thread 12. The monitoring thread 12 creates usage data on the basis of the primary information by adding and/or modifying information if necessary. Specifically, the monitoring thread 12 converts the protocol name, the host name, and the file name into a URL format (for example, http://www.company.com/index.html), and adds window identifier information and request time information to the URL format information. The monitoring thread 12 sends the usage data to a writing thread 13 in step 8. In step 9, the writing thread 13 writes the received usage data to the usage history file 30.

Figures 9, 10:
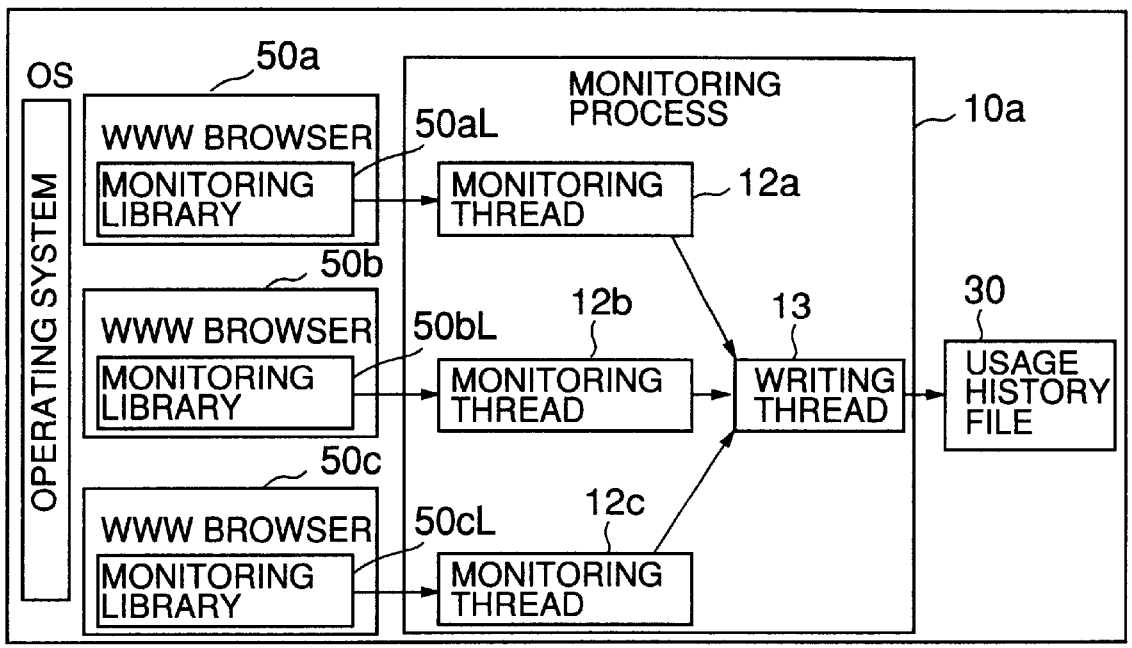
FIG. 9 is a block diagram of an information processing device according to a fourth embodiment of the present invention.
FIG. 10 is a table showing an example of usage data acquired by the information processing device.

FIG. 9 is a block diagram of an information processing device 104 according to a fourth embodiment of the present invention, and shows the operation of monitoring the request file history of the WWW browser 50. In the information processing device 104, a plurality of WWW browsers are executed.

The information processing device 104 is a personal computer, for example. As shown in FIG. 9, the information processing device 104 includes a monitoring process 10a, the usage history file 30, WWW browsers 50a, 50b and 50c, and the operating system OS. The monitoring process 10a includes monitoring threads 12a, 12b and 12c, and the writing thread 13. The WWW browsers 50a, 50b, and 50c includes monitoring-specific libraries 50aL, 50bL, and 50cL, respectively.

FIG. 10 shows an example of a usage data file acquired in the information processing device 104.

When the plurality of the WWW browsers 50a–50c are executed within one information processing device 104, the procedure of steps 2 through 5 in FIG. 8 is executed in each of the WWW browsers 50a–50c, and the same number of the monitoring threads 12a–12c as the number of the WWW browsers are launched. Each of the monitoring threads 12a–12c sends the usage data to the writing thread 13.

According to the above-mentioned embodiments, detailed usage data can be acquired by only modifying the application-specific process without any modification of the application since the monitoring-specific library is inserted between the application and the operating system, or between the application and the library, and/or the first several bites of a function are rewritten in the communication library.

The application-specific processes of the above-mentioned embodiments are a process (1) of selecting only the send function among about 50 kinds of functions included in the wsock32.dll and a process (2) of retaining the protocol name, the host name, and the file name of the arguments of the send function.

As mentioned above, the information processing device can be realized by a personal computer which includes a program for executing the above-mentioned procedures. Further, computer systems other than the personal computer can be used as the information processing device of the present invention.

Figure 11:
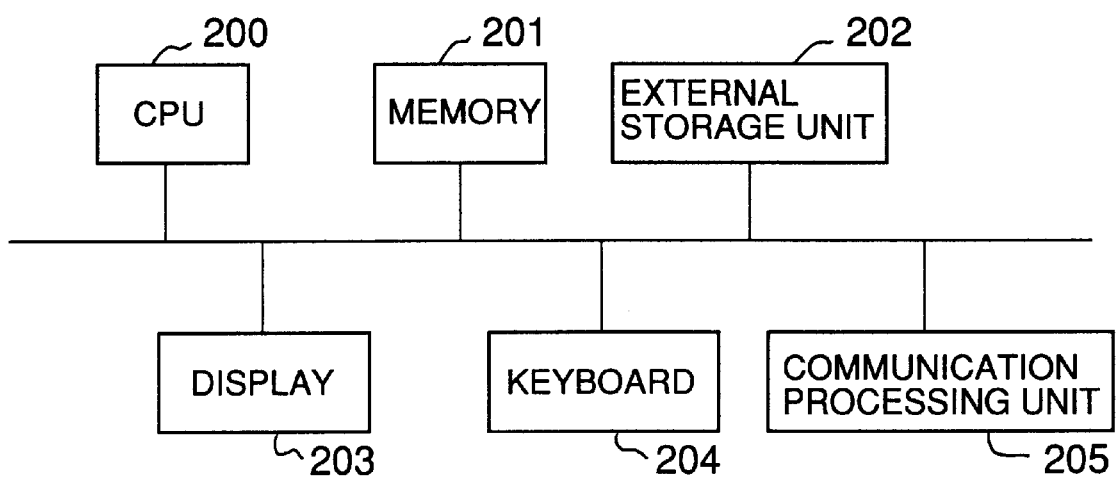
FIG. 11 is a block diagram of a computer system.

FIG. 11 is a block diagram of such a computer system. As shown in FIG. 11, the computer system includes a CPU 200 in which a process of a program is executed, a memory 201 for storing data and a program, an,external storage unit 202 for storing data and a program, a display 203, a keyboard 204, and a communication processing unit 205 which enables the computer system to connect to a network such as the Internet. The computer system can be used as the information processing device by installing a program for executing the above-mentioned procedures.

Further, the present invention is applicable to information processing systems other than computer systems. According to the present invention, usage data of the information processing systems can be acquired effectively.

In the following, a computer readable medium storing a computer program of the present invention will be described. An information processing device which includes the program operates in the following manner, for example.

When a WWW browser is launched by a user, the control thread of the monitoring process detects it. Then, the control thread requests the WWW browser to load the monitoring-specific library. The monitoring-specific library rewrites a head part of a program in the communication library, and inserts itself between the main body and the communication library. Next, the control thread launches the monitoring thread for receiving event information from the monitoring-specific library, and the monitoring thread establishes a connection between the monitoring thread and the communication library.

When the user designates a WWW page, the WWW browser sends a file request to a server using a network send function of the communication library. At the same time, the function call event is sent to the communication library through the monitoring-specific library. When the function call event or a function end event passes through the monitoring-specific library, the monitoring-specific library selects necessary functions among the functions of the events, and retains necessary argument information of the functions. Then, the monitoring-specific library sends the retained information to the monitoring thread. Next, the monitoring thread creates the usage data on the basis of the argument information, which is called primary information, by adding information and/or modifying the argument information if necessary. After that, the monitoring thread sends the usage data to the writing thread which writes the usage data to the usage history file.

A computer system such as the one shown in FIG. 11 can be used as the information processing device of the present invention by loading the program stored in the computer readable medium. The computer readable medium can be realized by a CD-ROM, a magnetic disk, a hard disk, an electronic memory, or the like. The memory 201 and the external storage unit 202 shown in FIG. 11 are also examples of the computer readable medium.

According to the present invention, detailed usage data can be acquired only by modifying the application-specific process without any modification of the application since the monitoring-specific library is inserted between the application and the operating system, or between the application and the library, and/or the first several bites of a function are rewritten in the communication library.

In the above-mentioned embodiment, a WWW browser is used as the application. However, the present invention is also applicable to word-processing software, spreadsheet software, and the like. Further, the present invention is also applicable to UNIX and other operating systems other than the Windows operating system.

The present invention is not limited to the specifically disclosed embodiments, and variations and modifications may be made without departing from the scope of the invention.

What is claimed is:

1. A method used in an information processing device for acquiring usage data of an application on the information processing device, the method comprising the steps of:

requesting the application to load a monitoring library by a control thread of a monitoring process when the application is launched;

rewriting a head part of a program in a predetermined library by the monitoring library;

inserting the monitoring library between the application and the predetermined library;

launching, by the control thread, a monitoring thread for receiving event information from the monitoring library;

intercepting one of a function call event and a function end event by the monitoring library when the application is used;

selecting at least one function among event information and retaining argument information of the at least one function by the monitoring library based on application-specific information;

sending the argument information to the monitoring thread by the monitoring library;

creating the usage data based on the argument information by the monitoring thread;

sending the usage data to a writing thread by the monitoring thread; and writing the usage data to a file by the writing thread.

2. The method of claim 1, wherein the monitoring library is at least one monitoring library, and at least one of the at least one monitoring library aggregates the usage data arising from at least one application of a plurality of applications in the monitoring process if the monitoring process monitors the plurality of applications.

3. The method of claim 1, wherein the application is a WWW browser and the usage data includes an address of a file requested by the WWW browser.

4. The method of claim 3, wherein the monitoring library is at least one monitoring library, and at least one of the at least one monitoring library aggregates the usage data arising from at least one application of a plurality of applications in the monitoring process if the monitoring process monitors the plurality of applications.

5. An information processing device for acquiring usage data of an application on the information processing device, the information processing device comprising:

means for requesting the application to load a monitoring library by a control thread of a monitoring process when the application is launched;

means for rewriting a head part of a program in a predetermined library by the monitoring library, and for inserting the monitoring library between the application and the predetermined library;

means for launching, by the control thread, a monitoring thread for receiving event information from the monitoring library;

means for intercepting one of a function call event and a function end event by the monitoring library when the application is used;

means for selecting at least one function among event information and retaining argument information of the at least one function by the monitoring library based on application-specific information;

means for sending the argument information to the monitoring thread by the monitoring library;

means for creating the usage data based on the argument information by the monitoring thread;

means for sending the usage data to a writing thread by the monitoring thread; and means for writing the usage data to a file by the writing thread.

6. The information processing device of claim 5, wherein the monitoring library is at least one monitoring library, and at least one of the at least one monitoring library aggregates the usage data arising from at least one application of a plurality of applications in the monitoring process if the monitoring process monitors the plurality of applications.

7. The information processing device of claim 5, wherein the application is a WWW browser and the usage data includes an address of a file requested by the WWW browser.

8. The information processing device of claim 7, wherein the monitoring library is at least one monitoring library, and at least one of the at least one monitoring library aggregates the usage data arising from at least one application of a plurality of applications in the monitoring process if the monitoring process monitors the plurality of applications.

9. A computer readable medium storing program code for causing a computer to acquire usage data of an application, comprising:

program code means for requesting the application to load a monitoring library by a control thread of a monitoring process when the application is launched;

program code means for rewriting a head part of a program in a predetermined library by the monitoring library, and for inserting the monitoring library between the application and the predetermined library;

program code means for launching, by the control thread, a monitoring thread for receiving event information from the monitoring library;

program code means for intercepting one of a function call event and a function end event by the monitoring library when the application is used;

program code means for selecting at least one function among event information and retaining argument information of the at least one function by the monitoring library based on application-specific information;

program code means for sending the argument information to the monitoring thread by the monitoring library;

program code means for creating the usage data based on the argument information by the monitoring thread;

program code means for sending the usage data to a writing thread by the monitoring thread; and program code means for writing the usage data to a file by the writing thread.

10. The computer readable medium of claim 9, wherein the monitoring library is at least one monitoring library, and at least one of the at least one monitoring library aggregates the usage data arising from at least one application of a plurality of applications in the monitoring process if the monitoring process monitors the plurality of applications.

11. The computer readable medium of claim 9, wherein the application is a WWW browser and the usage data includes an address of a file requested by the WWW browser.

12. The computer readable medium of claim 11, wherein the monitoring library is at least one monitoring library, and at least one of the at least one monitoring library aggregates the usage data arising from at least one application of a plurality of applications in the monitoring process if the monitoring process monitors the plurality of applications.

13. An information processing device for acquiring usage data of an application on the information processing device, the information processing device comprising:

a requesting arrangement for requesting the application to load a monitoring library by a control thread of a monitoring process when the application is launched;

a rewriting and inserting arrangement for rewriting a head part of a program in a predetermined library by the monitoring library, and for inserting the monitoring library between the application and the predetermined library;

a launching arrangement for launching, by the control thread, a monitoring thread for receiving event information from the monitoring library;

an intercepting arrangement for intercepting one of a function call event and a function end event by the monitoring library when the application is used;

a selecting arrangement for selecting at least one function among event information and retaining argument information of the at least one function by the monitoring library based on application-specific information;

a first sending arrangement for sending the argument information to the monitoring thread by the monitoring library;

a creating arrangement for creating the usage data based on the argument information by the monitoring thread;

a second sending arrangement for sending the usage data to a writing thread by the monitoring thread; and a writing arrangement for writing the usage data to a file by the writing thread.

14. The information processing device of claim 13, wherein the monitoring library is at least one monitoring library, and at least one of the at least one monitoring library aggregates the usage data arising from at least one application of a plurality of applications in the monitoring process if the monitoring process monitors the plurality of applications.

15. The information processing device of claim 13, wherein the application is a WWW browser and the usage data includes an address of a file requested by the WWW browser.

16. The information processing device of claim 15, wherein the monitoring library is at least one monitoring library, and at least one of the at least one monitoring library aggregates the usage data arising from at least one application of a plurality of applications in the monitoring process if the monitoring process monitors the plurality of applications.

* * * * *

UNITED STATES PATENT AND TRADEMARK OFFICE
CERTIFICATE OF CORRECTION

PATENT NO. : 6,351,847 B2 Page 1 of 1
APPLICATION NO. : 09/295929
DATED : February 26, 2002
INVENTOR(S) : Yasuhisa Sakamoto et al.

It is certified that error appears in the above-identified patent and that said Letters Patent is hereby corrected as shown below:

Column 7, line 55, change "an, external" to --an external--.

Signed and Sealed this

Twenty-second Day of August, 2006

JON W. DUDAS
*Director of the United States Patent and Trademark Office*